(12) United States Patent
Thurow et al.

(10) Patent No.: US 7,926,794 B2
(45) Date of Patent: Apr. 19, 2011

(54) AIR SPRING ROLLING-LOBE FLEXIBLE MEMBER MADE OF ELASTOMERIC MATERIAL

(75) Inventors: Gerhard Thurow, Garbsen (DE); Hubertus Gawinski, Lauenau (DE); Christoph Bank, Lehrte (DE); Paul Cerny, Wennigsen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 969 days.

(21) Appl. No.: 11/547,076

(22) PCT Filed: Feb. 24, 2005

(86) PCT No.: PCT/EP2005/050782
§ 371 (c)(1),
(2), (4) Date: Dec. 19, 2006

(87) PCT Pub. No.: WO2005/098261
PCT Pub. Date: Oct. 20, 2005

(65) Prior Publication Data
US 2007/0205545 A1 Sep. 6, 2007

(30) Foreign Application Priority Data
Apr. 5, 2004 (DE) .......................... 10 2004 016 660

(51) Int. Cl.
*F16F 1/36* (2006.01)

(52) U.S. Cl. ............... 267/64.24; 267/64.11; 267/64.18; 267/64.19; 267/64.21; 267/64.23; 267/64.27; 267/64.28; 428/34.5; 428/217

(58) Field of Classification Search ............... 267/64.24, 267/64.27, 65, 162, 226; 73/161; 264/242, 264/248, 261, 263; 428/565, 458, 556, 51, 428/309, 98, 292.1, 304, 323, 332, 212–218
See application file for complete search history.

(56) References Cited

U.S. PATENT DOCUMENTS

| 3,438,309 | A | * | 4/1969 | Boileau | 92/103 R |
| 5,566,929 | A | * | 10/1996 | Thurow | 267/64.24 |
| 6,264,178 | B1 | * | 7/2001 | Schisler et al. | 267/64.27 |
| 6,719,279 | B1 | | 4/2004 | Koch et al. | |
| 7,063,308 | B2 | * | 6/2006 | Binder | 267/64.27 |

* cited by examiner

*Primary Examiner* — Robert A Siconolfi
*Assistant Examiner* — San Aung
(74) *Attorney, Agent, or Firm* — Walter Ottesen

(57) ABSTRACT

An air spring rolling-lobe flexible member, which is made of elastomeric material, has a reinforcement arrangement which is embedded in the flexible member wall (1). The reinforcement arrangement extends along the entire length of the flexible member and is of rubber-coated cord fabric layers (3, 4). The flexible member has a non-symmetric reinforcement arrangement wherein the one outer fabric layer (3) or the several outer fabric layers has/have a stress-elongation characteristic which is different from that of the one inner fabric layer (4) or the several inner fabric layers.

5 Claims, 1 Drawing Sheet

AIR SPRING ROLLING-LOBE FLEXIBLE MEMBER MADE OF ELASTOMERIC MATERIAL

RELATED APPLICATION

This application is the national stage of PCT/EP2005/050782, filed Feb. 24, 2005, designating the United States and claiming priority from German patent application no. 10 2004 016 660.9, filed Apr. 5, 2004, the entire contents of which are incorporated herein by reference.

FIELD OF THE INVENTION

The invention relates to an air spring rolling-lobe flexible member made of elastomeric material for an air spring with or without an outer guide and having a reinforcement arrangement of rubberized cord fabric layers embedded in the wall of the flexible member. The reinforcement arrangement extends over the entire length of the flexible member and the cord threads of the rubberized cord fabric layers are arranged so that they are inclined mirror symmetrically to the peripheral direction of the flexible member and the flexible member forms a rolling lobe which changes during spring action in the operating state.

BACKGROUND OF THE INVENTION

Rolling-lobe flexible members of air springs have proven effective to a great extent, for example, as vehicle suspensions especially for suspending the wheel axles of trucks and buses. The rolling-lobe flexible members are attached at a first end to a roll-off piston which is usually made of metal or plastic. In the operating state, the piston moves within the rolling-lobe flexible member which folds outside in and forms a rolling lobe which rolls on the outer surface of the roll-off piston.

The reinforcement arrangement takes up forces which arise because of the overpressure in the rolling-lobe flexible member of the air spring. In air spring flexible members, the cord fabric layer preferably comprises fully synthetic fibers such as polyamide. The so-called cord fabric is manufactured from the cord threads and is made of a multiplicity of cord threads in warp direction lying parallel next to each other. The cord threads are held loosely together at greater spacings by a few thin threads in the weft direction. This cord fabric layer is rubberized with a suitable rubber mixture such as a polychloroprene mixture and, after being cut at an angle, four or six layers are built into the air spring rolling-lobe flexible member so that the cords lie crosswise. Depending upon the type of air spring, the cord threads of the two cord fabric sheets each have a winding angle of approximately 40° to 80° referred to the peripheral direction. For the commercial mass manufacture, it is important that the angles of all fabric layers are mirror symmetrical with respect to the peripheral direction. Accordingly, if one fabric layer defines an angle of, for example, 60° with respect to the peripheral direction, then the fabric layer which crosses this fabric layer must also form an angle of 60° with the peripheral direction. The first winding angle is formed in the clockwise direction and the second winding angle is formed in the counterclockwise direction with both being from the peripheral direction.

Most air spring rolling-lobe flexible members for motor vehicles are manufactured with two mutually crossing fabric layers in order to achieve a high flexibility of the flexible member wall of the air spring rolling-lobe flexible member. As a consequence of increasing commercial loads of motor vehicles and ever smaller structural spaces for mounting, present day air springs must withstand ever higher pressures, for example, in the region of 10 bar or more. In order to be able to withstand higher operating pressures, it would be conceivable to arrange four or six cord fabric layers in the flexible member wall. Because of the small structural size of the air spring rolling-lobe flexible member, the strengthening reinforcement arrangement must, however, be very thin because a very small roll-off radius must be present.

In the roll-off radius, a higher tensile load occurs in the fabric layer, which comes to lie outwardly, than in the inner fabric layer because of the spacing of the fabric layers. At high pressures, this can lead to the condition that, for example, in a two layer reinforcement arrangement, the total air spring load is carried only by the outer fabric layer and the inner fabric layer no longer contributes. This leads to a serious reduction of the bursting pressure of the flexible member and to an extreme shortening of the service life.

U.S. Pat. No. 5,566,929 describes an air spring rolling-lobe flexible member wherein the service life is intended to be improved by utilizing a reinforcement arrangement having three fabric layers. The build-up of these three fabric layers is symmetrical to the center of the reinforcement arrangement. The middle fabric layer has a strength which corresponds to the sum of the two strengths of the outer fabric layers. The outer fabric layers are arranged symmetrically to the middle layer and have the same reinforcement. With the use of three fabric layers, the bonding surface between rubber layers and fabric layers is increased which leads to an improved service life.

The disadvantage described initially herein that the outer fabric layer, because of the bending of the flexible member in the rolling-lobe, experiences a greater strain or elongation than the layers which lie further inwardly, and therefore must take up proportionally more force, is, however, not eliminated by this configuration.

SUMMARY OF THE INVENTION

The invention therefore is based on the task of providing an air spring rolling-lobe flexible member which has a reinforcement arrangement having a winding angle of the fabric layers which is mirror symmetrical to the peripheral direction and wherein, also at high operating pressures, the fabric layers experience a uniform loading in the rolling lobe.

The task of the invention is solved in that the air spring rolling-lobe flexible member has a non-symmetrical reinforcement arrangement wherein the one outer fabric layer or the several outer fabric layers have a different stress-strain characteristic relative to the one inner fabric layer or the several inner fabric layers.

This arrangement affords the advantage that each fabric layer of the flexible member can be matched optimally to the particular operating load in the rolling lobe of the air spring rolling-lobe flexible member.

In a further embodiment of the invention, the reinforcement arrangement has two different fabric layers.

This arrangement has the advantage that the flexible member wall of the air spring rolling-lobe flexible member is very thin and is flexibly configured and therefore the service life of the flexible member is improved.

In a further embodiment of the invention, the fabric layers of the reinforcement arrangement of the air spring rolling-lobe flexible member have different thread materials.

When using a high-strength thread for the outer fabric layer, it is advantageous that the thread thicknesses of the two layers be approximately the same. In this way, an especially thin flexible member wall is likewise obtainable.

In a further embodiment of the invention, the fabric layers of the reinforcement arrangement of the air spring rolling-lobe flexible member have different thread thicknesses. In this arrangement, it is advantageous that the same material can be used for both fabric layers whereby, for both layers, the same adhesion conditions between the threads and the rubber material, which surrounds the threads, are adjustable.

The arrangement of the invention of the reinforcement arrangements guarantees that the fabric layers can be matched optimally to each other. Depending upon the application, stiffer or more flexible flexible member walls of different thicknesses can be realized for symmetrical winding angles of the fabric layers. In this way, a long service life is obtainable also at high operating pressures.

BRIEF DESCRIPTION OF THE DRAWING

The invention will now be described with reference to the single figure of the drawing (FIG. 1).

DESCRIPTION OF THE PREFERRED EMBODIMENTS OF THE INVENTION

Figure 1:
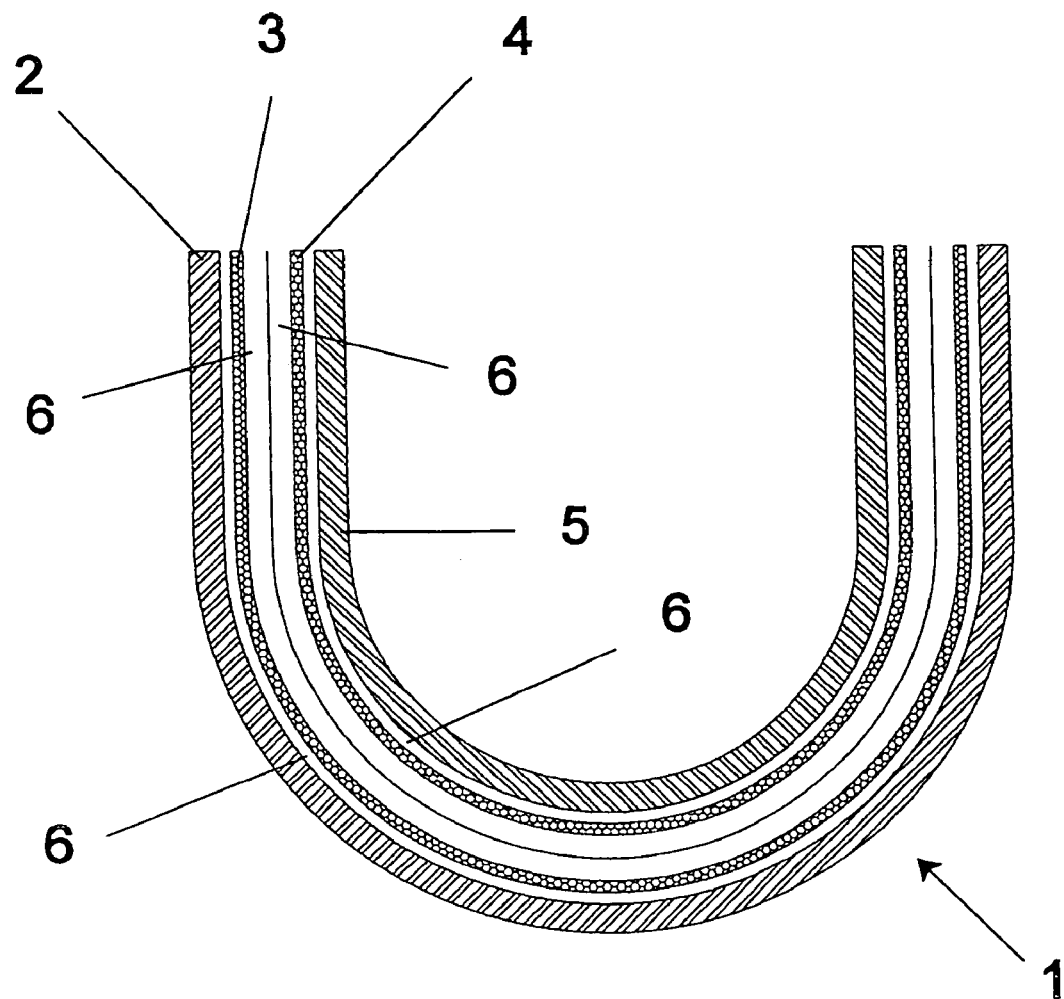

FIG. 1 shows a section from an air spring flexible member wall 1 with the section being configured as a rolling lobe of a rolling-lobe air spring. The wall 1 includes an outer rubber cover layer 2, an outer fabric layer 3, an inner fabric layer 4 and an inner rubber layer 5. The fabric layers 3 and 4 are each coated with a rubber adhesion layer 6 on the inside and outside. All mentioned layers 2 to 6 are vulcanized tightly one upon the other.

The outer fabric layer 3 has a higher elongation because of the use of a different material compared to the inner fabric layer 4 and this elongation is so dimensioned that the outer fabric layer 3 and the inner fabric layer 4 take up the same load in the rolling lobe during operation. The outer fabric layer 3 is stretched more than the inner fabric layer 4.

The outer fabric layer 3 can be stretched more because of the use of a cord material having greater elongation in the outer fabric layer 3 compared to the inner fabric layer 4 and, in this way, the longer length is obtained, which is necessary in the rolling lobe for the outer layer of the flexible member wall 1, for the same load take up as in the inner fabric layer 4. The rubber adhesion layers 6 vulcanized together ensure the necessary cohesion of the fabric layers 3 and 4. In this way, the reinforcement arrangement of the air spring flexible member wall 1 in the rolling lobe takes up the load to be carried uniformly distributed on the fabric layers 3 and 4. This leads to an increased bursting pressure and an extended service life.

REFERENCE NUMERALS

1 Flexible member wall of a rolling-lobe air spring
2 Outer rubber cover layer
3 Outer fabric layer
4 Inner fabric layer
5 Inner rubber layer
6 Rubber adhesion layer

The invention claimed is:

1. A rolling-lobe flexible member of elastomeric material for an air spring, the flexible member forming a rolling lobe during spring action in the operating state, the flexible member comprising:
   a wall wherein a rolling lobe forms during operation of said air spring;
   a reinforcement arrangement embedded in said wall and extending over the length of said flexible member;
   said reinforcement arrangement including mutually separate first and second rubberized cord fabric layers disposed in spaced relationship to each other over said length of said flexible member;
   said first rubberized cord fabric layer being an outer rubberized cord fabric layer and having a first stress-strain characteristic; and,
   said second rubberized cord fabric layer being an inner rubberized cord fabric layer having a second stress-strain characteristic different from said first stress-strain characteristic so as to cause said reinforcement arrangement to be unsymmetrical with respect to said first and second stress-strain characteristics.

2. The rolling-lobe flexible member of claim 1, wherein the flexible member defines a peripheral direction; and, said fabric layers have cord threads arranged inclined mirror symmetrically with respect to said peripheral direction.

3. The rolling-lobe flexible member of claim 2, wherein said outer rubberized cord fabric layer is different from said inner rubberized cord fabric layer.

4. The rolling-lobe flexible member of claim 3, wherein said fabric layers of said reinforcement arrangement have cord threads made of different thread materials.

5. The rolling-lobe flexible member of claim 4, wherein said fabric layers have cord threads of different thicknesses.

* * * * *